(12) United States Patent
Todune

(10) Patent No.: US 7,930,009 B2
(45) Date of Patent: Apr. 19, 2011

(54) SLIDE MECHANISM AND ELECTRONIC APPARATUS

(75) Inventor: Toshimasa Todune, Saitama (JP)

(73) Assignee: Sony Corporation, Tokyo (JP)

( * ) Notice: Subject to any disclaimer, the term of this patent is extended or adjusted under 35 U.S.C. 154(b) by 494 days.

(21) Appl. No.: 12/143,576

(22) Filed: Jun. 20, 2008

(65) Prior Publication Data

US 2008/0318647 A1 Dec. 25, 2008

(30) Foreign Application Priority Data

Jun. 20, 2007 (JP) ................................ P2007-162442

(51) Int. Cl.
*H04M 1/00* (2006.01)
(52) U.S. Cl. ................. 455/575.4; 455/575.1; 455/90.3; 455/566; 455/347; 455/348; 379/433.01; 379/433.04; 379/433.07; 379/433.1; 379/433.11; 379/433.12
(58) Field of Classification Search ............... 455/575.1, 455/575.3, 575.4, 90.3, 566, 347–349; 379/433.01, 379/433.04, 433.07, 433.1, 433.11, 433.12, 379/433.13

See application file for complete search history.

(56) References Cited

U.S. PATENT DOCUMENTS

| | | | |
|---|---|---|---|
| 7,076,058 B2 * | 7/2006 | Ikeuchi et al. | 379/433.12 |
| 7,107,018 B2 * | 9/2006 | Jellicoe | 455/90.3 |
| 7,269,451 B2 * | 9/2007 | Kwon | 455/575.4 |
| 7,331,516 B2 * | 2/2008 | Hwang et al. | 235/380 |
| 7,385,150 B1 * | 6/2008 | Siddiqui et al. | 200/5 A |
| 7,496,389 B2 * | 2/2009 | Cho et al. | 455/575.4 |
| 7,610,069 B2 * | 10/2009 | Kwak et al. | 455/575.4 |
| 7,636,592 B2 * | 12/2009 | Kim et al. | 455/575.4 |
| 7,778,663 B2 * | 8/2010 | Bong Doo | 455/556.1 |
| 7,813,776 B2 * | 10/2010 | Lee et al. | 455/575.4 |
| 2005/0070348 A1 * | 3/2005 | Lee et al. | 455/575.4 |
| 2005/0245251 A1 | 11/2005 | Lee | |
| 2005/0255897 A1 | 11/2005 | Lee | |
| 2007/0004477 A1 * | 1/2007 | Kim | 455/575.4 |
| 2007/0037618 A1 * | 2/2007 | Lee | 455/575.4 |

\* cited by examiner

*Primary Examiner* — Tuan A Tran
(74) *Attorney, Agent, or Firm* — Oblon, Spivak, McClelland, Maier & Neustadt, L.L.P.

(57) ABSTRACT

An electronic apparatus, comprising a lid member including a display section; an intermediate member including the lid member connected thereto, that is configured to slide in a first direction, and including a second operation section which is exposed in an interlocking relationship with the sliding movement of the lid member; and a base member including the intermediate member connected thereto, that is configured to slide in a second direction perpendicular to the first direction, and including a first operation section which is exposed in an interlocking relationship with the sliding movement of the intermediate member, wherein at least one of the sliding movement of the lid member and the sliding movement of the intermediate member is an arcuate movement.

13 Claims, 14 Drawing Sheets

SLIDE MECHANISM AND ELECTRONIC APPARATUS

BACKGROUND OF THE INVENTION

1. Field of the Invention

This invention relates to a technical field regarding a slide mechanism and an electronic apparatus. Particularly, one embodiment of the invention relates to a technical field wherein at least one of directions in which a lid member is moved is defined as a direction in which arcuate movement is carried out to achieve improvement in convenience in use.

2. Description of the Related Art

Some of various electronic apparatus such as personal digital assistants and portable telephone terminals have an operation section for being operated to execute a predetermined function and a display section on which an operation state for the operation section or an image is displayed.

One of such electronic apparatus as described above is configured such that it includes a base member having a first operation section thereon and, an intermediate member having a second operation section thereon, and a lid member having a display section thereon and the intermediate member is disposed between the lid member and the base member such that, when the lid member is moved in a first direction with respect to the intermediate member, the second operation section is opened to allow an operation for the second operation section, but when the lid member and the intermediate member are moved integrally in a second direction with respect to the base member, the first operation section is opened to allow an operation for the first operation section (refer to, for example, Patent Document 1).

Accordingly, a user can carry out on operation separately for the first operation section or the second operation section in accordance with an application, and the electronic apparatus has an advantage that the width of the application is expanded.

Patent Document 1: Specification of U.S. Patent Published Application No. 2005/0245251

However, in the conventional electronic apparatus described above, since the second direction in which the lid member and the intermediate member move with respect to the base member and the first direction in which the lid member moves with respect to the intermediate member are perpendicular directions to each other in a two-dimensional plane, the orientation of the display section and the orientation of the first operation section in a state wherein the first operation section is open are same as each other and the orientation of the display section and the orientation of the second operation section in another state wherein the second operation section is open are same as each other.

Accordingly, to a user, the operation direction (depression direction) for the operation keys of the operation sections and the direction in which the display section is visually observed are same as each other. Thus, the user cannot use the electronic apparatus in a state wherein the display section is inclined with respect to the operation section, for example, as in the case of a personal computer. Further, the user cannot use the electronic apparatus in a state wherein the display section and the operation sections are inclined at a fixed angle as in the case of a telephone terminal. Therefore, the electronic apparatus has a problem that it is not good in convenience in use.

Therefore, it is a subject of a slide mechanism and an electronic apparatus of one embodiment of the invention to overcome the problem described above and achieve improvement in convenience in use.

BRIEF SUMMARY OF THE INVENTION

In order to solve the problem described above, a slide mechanism and an electronic apparatus of one embodiment of the invention are configured such that a lid member is mounted for sliding movement in a first direction between a first open position and a first closed position with respect to an intermediate member, that the lid member and the intermediate member are mounted for sliding movement integrally in a second direction perpendicular to the first direction between a second open position and a second closed position with respect to a base member, that at least one of the first direction and the second direction is defined as a direction in which an arcuate movement is carried out, that the second operation section is opened (exposed) when the lid member is moved to the first open position, that the second operation section is closed when the lid member is moved to the first closed position, that the first operation section is opened (exposed) when the lid member and the intermediate member are moved to the second open position, and that the first operation section is closed when the lid member and the intermediate member are moved to the second closed position.

Accordingly, in the slide mechanism and the electronic apparatus of one embodiment of the invention, when the lid member is moved to at least one of the first open position and the second open position, the lid member is placed into a state wherein it is inclined with respect to the intermediate member or the base member.

The slide mechanism of one embodiment of the invention, is a slide mechanism wherein an intermediate member having a second operation section is positioned between a lid member having a display section and a base member having a first operation section and the lid member is mounted for sliding movement with respect to the intermediate member while the intermediate member is mounted for sliding movement with respect to the base member, configured such that the lid member is mounted for sliding movement in a first direction between a first open position and a first closed position with respect to the intermediate member, that the lid member and the intermediate member are mounted for sliding movement integrally in a second direction perpendicular to the first direction between a second open position and a second closed position with respect to the base member, that at least one of the first direction and the second direction is defined as a direction in which an arcuate movement is carried out, that the second operation section is opened when the lid member is moved to the first open position, that the second operation section is closed when the lid member is moved to the first closed position, that the first operation section is opened when the lid member and the intermediate member are moved to the second open position, and that the first operation section is closed when the lid member and the intermediate member are moved to the second closed position.

Accordingly, in the state wherein the lid member is slidably moved in the arcuate direction with respect to the base member, the display section of the lid member can be placed in a state wherein it is inclined by a predetermined angle with respect to the first operation section or the second operation section. Therefore, upon operation for the first operation section or the second operation section, the display section can be visually observed readily, and improvement in convenience in use can be anticipated.

In an embodiment of the invention, a support base is provided on the base member while a slider is provided on the lid member, and a slide member supported for sliding movement in the second direction and supporting the slider for sliding movement in the first direction is provided on the support base while the support base is disposed on the inner side with respect to an outer periphery of the base member and the slider is disposed on the inner side with respect to an outer periphery of the lid member and besides the slide member is disposed on the inner side with respect to an outer periphery of the intermediate member. Therefore, the slide mechanisms are not exposed to the outside and no damage occurs to the slide mechanisms, and smooth sliding movement of the lid member and the intermediate member can be anticipated.

In an embodiment of the invention, a first blocking portion for blocking movement of the lid member toward the second direction when the lid member is moved in the first direction is provided, and a second blocking portion for blocking movement of the lid member and the intermediate member toward the first direction when the lid member and the intermediate member are moved in the second direction is provided. Therefore, movement of the lid member and the intermediate member in an unintended direction can be prevented.

In an embodiment of the invention, a first blocking portion for blocking movement of the lid member toward the second direction when the lid member is moved in the first direction is provided, and a second blocking portion for blocking movement of the lid member and the intermediate member toward the first direction when the lid member and the intermediate member are moved in the second direction is provided, and besides the first blocking portion and the second blocking portion are provided on the support based. Therefore, simplification of the mechanism can be anticipated.

In an embodiment of the invention, both of the first blocking portion and the second blocking portion are formed in a projecting manner and provided integrally on the base member. Therefore, reduction of the production cost by reduction of the number of parts can be anticipated.

The electronic apparatus of one embodiment of invention is an electronic apparatus which includes a lid member having a display section, a base member having a first operation section and an intermediate member having a second operation section wherein the intermediate member is positioned between the lid member and the base member, and the lid member is mounted for sliding movement with respect to the intermediate member while the intermediate member is mounted for sliding movement with respect to the base member, configured such that the lid member is mounted for sliding movement in a first direction between a first open position and a first closed position with respect to the intermediate member, that the lid member and the intermediate member are mounted for sliding movement integrally in a second direction perpendicular to the first direction between a second open position and a second closed position with respect to the base member, that at least one of the first direction and the second direction is defined as a direction in which an arcuate movement is carried out, that the second operation section is opened when the lid member is moved to the first open position, that the second operation section is closed when the lid member is moved to the first closed position, that the first operation section is opened when the lid member and the intermediate member are moved to the second open position, and that the first operation section is closed when the lid member and the intermediate member are moved to the second closed position.

Accordingly, since, in the state wherein the lid member is slidably moved in the arcuate direction with respect to the base member, the display section of the lid member can be placed in a state wherein it is inclined by a predetermined angle with respect to the first operation section or the second operation section, upon operation for the first operation section or the second operation section, the display section can be visually observed readily, and improvement in convenience in use can be anticipated.

DETAILED DESCRIPTION OF THE INVENTION

In the following, one embodiment for carrying out a slide mechanism and an electronic apparatus of one embodiment of invention is described with reference to the accompanying drawings.

In the embodiment described below, the electronic apparatus of one embodiment of invention is applied to a personal digital assistant, and the slide mechanism of one embodiment of the invention is applied to a slide mechanism provided in the personal digital assistant. It is to be noted that the scope of application of one embodiment of the invention is not limited to a personal digital assistant and a slide mechanism provided in the personal digital assistant, but one embodiment of the invention can be applied widely to various electronic apparatus which have a display section and an operation section and slide mechanisms provided in the electronic apparatus, that is, to various electronic apparatus such as, for example, portable telephone terminals, personal computers, PDAs (Personal Digital Assistants), network terminals, work stations, music players, recording and reproduction apparatus and image pickup apparatus and slide mechanisms provided in such electronic apparatus.

The electronic apparatus (personal digital assistant) described below is configured such that a lid member, an intermediate member and a base member are disposed in order in a layered relationship and the lid member and the intermediate member can be slidably moved integrally with each other with respect to the base member. In the following description, forward, backward, upward, downward, leftward and rightward directions are defined such that the side on which the lid member is positioned is the upper side while the side on which the base member is positioned is the lower side and the directions in which the lid member and the intermediate member are moved with respect to the base member are the leftward and rightward directions.

It is to be noted that the forward, backward, upward, downward, leftward and rightward directions in the following description are defined for the convenience of description, and they are not restricted to such directions when one embodiment of the invention is carried out.

Figure 1:
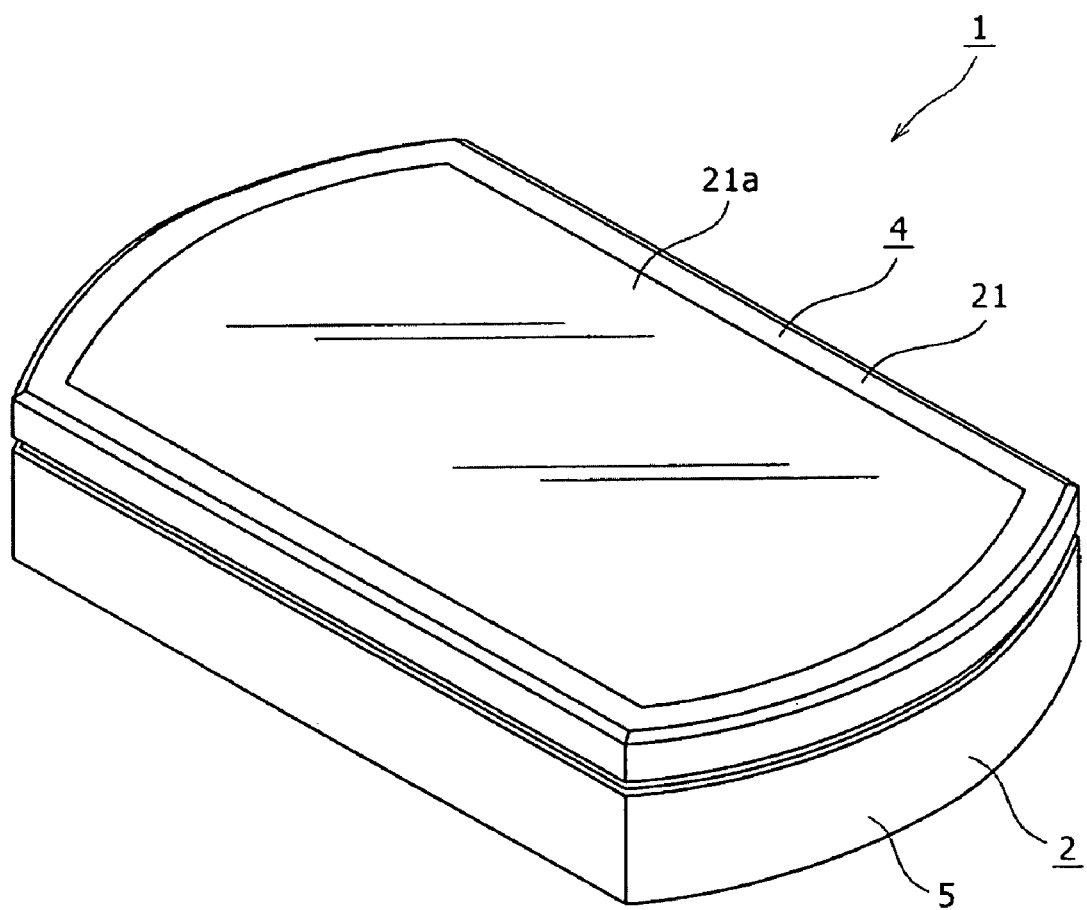
FIG. 1 shows one embodiment of the invention together with FIGS. 2 to 14, and this figure is a perspective view showing an electronic apparatus in a state wherein a first operation section and a second operation section are closed.
Figure 2:
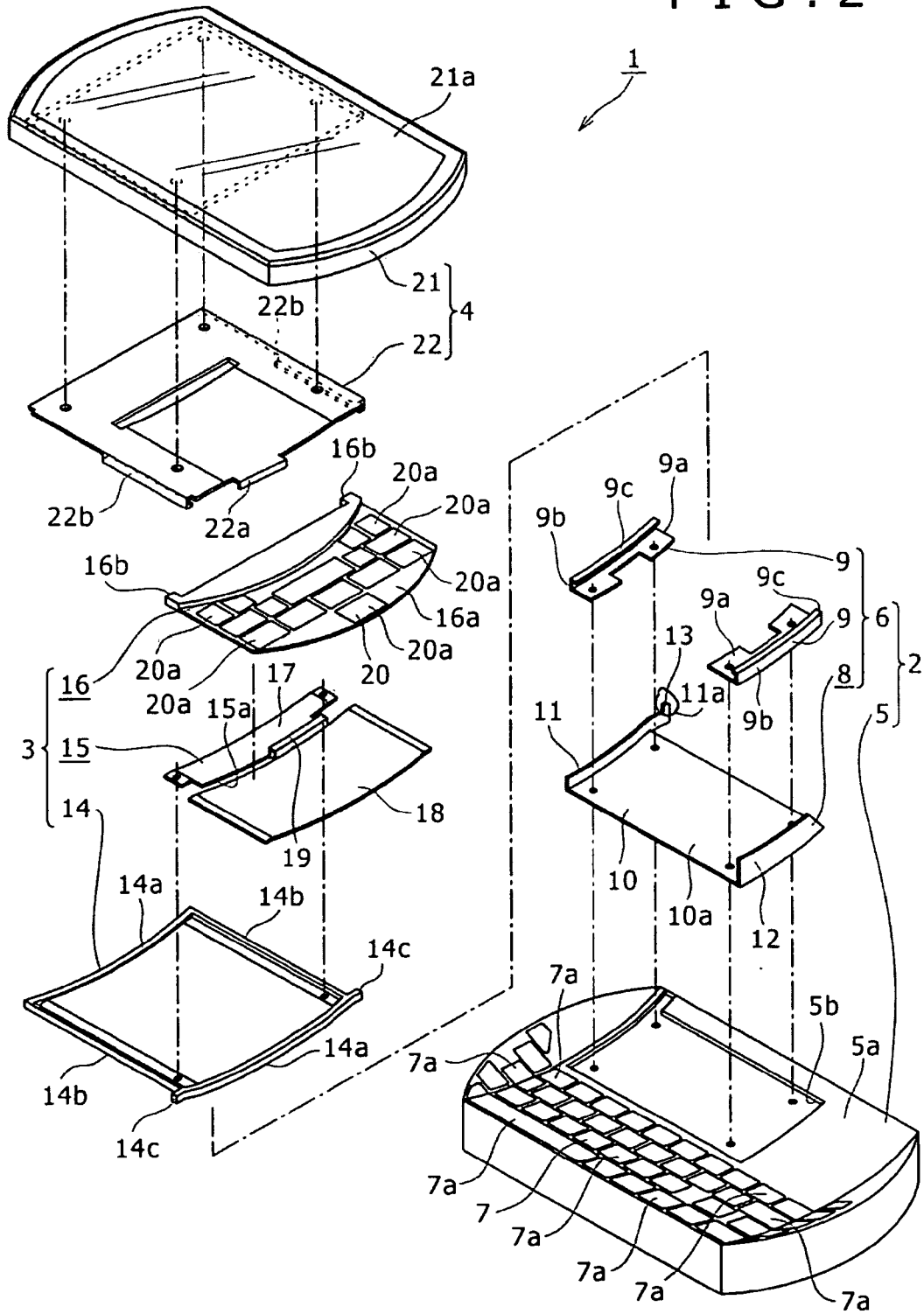
FIG. 2 is an exploded perspective view of the electronic apparatus.
Figure 3:
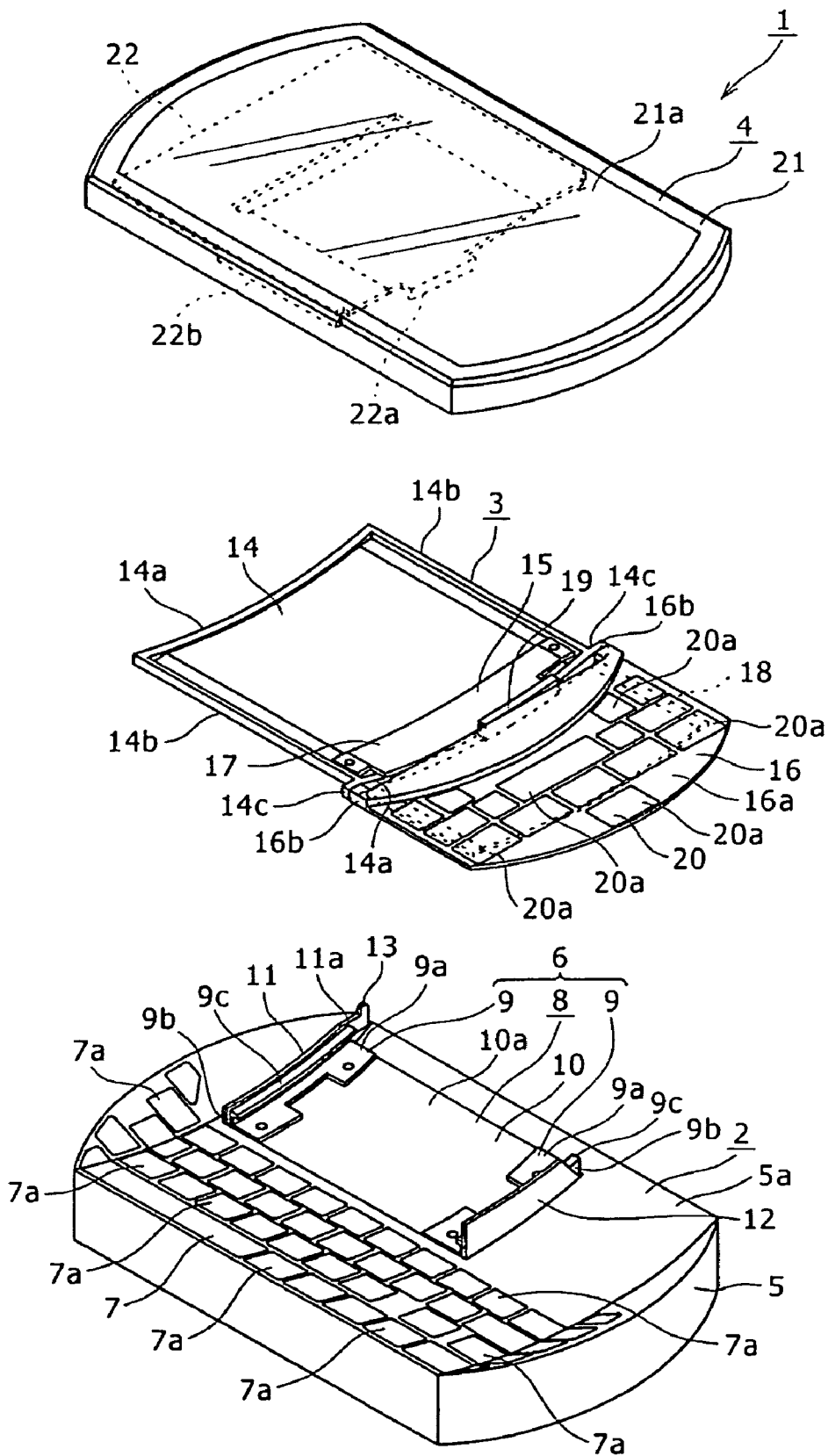
FIG. 3 is a perspective view showing the electronic apparatus in another state wherein it is disassembled in a lid member, an intermediate member and a base member.

The electronic apparatus (personal digital assistant) 1 is configured such that a base member 2, an intermediate member 3 and a lid member 4 are disposed in a layered relationship (refer to FIGS. 1 to 3) and the lid member 4 is positioned on the upper side and the base member 2 is positioned on the lower side while the intermediate member 3 is positioned between the base member 2 and the lid member 4.

The base member 2 has a body 5 and a support base 6 attached to an upper face of the body 5. The base member has a first face of an arcuate shape, a second face provided adjacent one side of the first face in an inclined relationship in a direction toward a center axis of the first face, and a third face provided adjacent the other side of the first face in an inclined relationship in a direction toward the center axis of the first face. A first operation section may be provided on the second face and the third face (Refer to FIGS. 2 and 3).

The body 5 is formed in a flattened transversely elongated shape and has an upper face 5a formed in a moderately curved face which is convex downwardly. A shallow arrangement recessed portion 5b is formed at a rear half portion of the upper face 5a of the body 5.

A first operation section 7 is provided at a substantially front half portion of the upper face 5a of the body 5 and is composed of a plurality of operation keys 7a, 7a, . . . . The operation keys 7a, 7a, . . . are arranged, for example, in arrangement (QWERTY arrangement) similar to that of operation keys provided on a keyboard of a personal computer.

The support base 6 includes a base member 8, and guide members 9, 9 attached to the base member 8. The support base 6 is attached to the body 5 in a state wherein it is disposed on the arrangement recessed portion 5b.

The base member 8 has a base portion 10 formed in a transversely elongated rectangular shape, a protruding portion 11 projecting upwardly from a left side edge of the base portion 10 and a guide protrusion 12 projecting upwardly from a right side edge of the base portion 10. The base portion 10 is formed in a moderately curved plane corresponding to the upper face 5a of the body 5 and has an upper face 10a positioned like the same plane as the upper face 5a of the body 5. A rear end portion 11a of the protruding portion 11 projects rearwardly from the base portion 10, and a blocking portion 13 projecting upwardly is provided at the rear end portion 11a.

The guide members 9, 9 are attached to the opposite left and right end portions of the upper face 10a of the base portion 10 of the base member 8. Each guide member 9 has an attached face portion 9a, a side face portion 9b projecting upwardly from a side edge on the outer side of the attached face portion 9a, and a holding face portion 9c projecting from the side face portion 9b in a direction so as to be positioned on the upper side of the attached face portion 9a. The guide members 9, 9 are formed in a moderately curved shape corresponding to the curvature of the base portion 10 of the base member 8. The guide members 9, 9 are attached at the attached face portions 9a, 9a thereof to the base portion 10 of the base member 8 and are positioned in a state wherein they are close to or contact with the inner side of the protruding portion 11 or the guide protrusion 12.

The intermediate member 3 includes a slide member 14, a connection plate 15 and an operation plate 16.

The slide member 14 is formed in a moderately curved plane which is convex downwardly corresponding to the upper face 5a of the base member 2 and has guided portions 14a, 14a at the opposite left and right end portions thereof while it has guide portions 14b, 14b at the opposite front and rear end portions thereof. A front end portion and a rear end portion of the right side guided portion 14a project forwardly or backwardly farther than the guide portions 14b, 14b and are provided as stopper projections 14c, 14c.

The slide member 14 engages, at the guided portions 14a, 14a thereof, for sliding movement with the guide members 9, 9 of the support base 6 and is supported for sliding movement in an arcuate direction on the support base 6.

The connection plate 15 includes an attached plate portion 17, an attachment plate portion 18 and a guided protrusion 19 formed integrally with each other.

The attached plate portion 17 is formed in a moderately curved plane which is convex downwardly corresponding to the slide member 14.

Also the attachment plate portion 18 is formed in a moderately curved plane which is convex downwardly and is positioned rightwardly of the attached plate portion 17.

The guided protrusion 19 is positioned between the attached plate portion 17 and the attachment plate portion 18 in a state wherein it interconnects them. The guided protrusion 19 has a cross sectional shape formed in a channel shape which is open downwardly and interconnects portions on the rear end side of the attached plate portion 17 and the attachment plate portion 18. Accordingly, a slit open forwardly is formed on the connection plate 15 on the front side of the guided protrusion 19, and this slit is used as an insertion slit 15a.

The operation plate 16 has an upper face 16a formed as a flat face, and a second operation section 20 is formed on the upper face 16a. The second operation section 20 includes a plurality of operation keys 20a, 20a, -, and the operation keys 20a, 20a, . . . are arranged in arrangement similar to that of operation keys provided, for example, at an operation section of a portable telephone terminal. Movement blocking projections 16b, 16b projecting leftwardly are provided at the opposite front and rear end portions of the operation plate 16.

The intermediate member 3 is configured such that the attached plate portion 17 of the connection plate 15 is attached from the upper side to the right end portion of the slide member 14 and the operation plate 16 is attached from the upper side to the attachment plate portion 18 of the connection plate 15.

The intermediate member 3 is supported for sliding movement in an arcuate direction along the upper face 5a of the body 5 on the base member 2 such that the guided portions 14a, 14a of the slide member 14 are individually engaged for sliding movement with the guide members 9, 9 of the support base 6.

In a state wherein the intermediate member 3 is supported on the base member 2, the guide protrusion 12 of the base member 8 of the base member 2 is inserted from the lower side into the insertion slit 15a of the connection plate 15 of the intermediate member 3 or the guided protrusion 19.

The lid member 4 is composed of a lid body 21 and a slider 22.

The lid body 21 is formed as a flat plate, and the shape and the size thereof as viewed from above are same as the shape and the size of the body 5 of the base member 2 as viewed from above. A display section 21a on which an image and so forth are displayed is provided at a portion of the lid body 21 except an outer peripheral portion.

The slider 22 is formed substantially as a flat plate of a substantially rectangular shape and has a blocked piece 22a provided on a right side edge hereof by being bent downwardly. Guided pieces 22b, 22b each formed by being bent downwardly are individually provided at a substantially right half portion of a front edge and a rear edge of the slider 22.

The lid member 4 is formed by the slider 22 attached to a lower face of the lid body 21.

Figure 4:
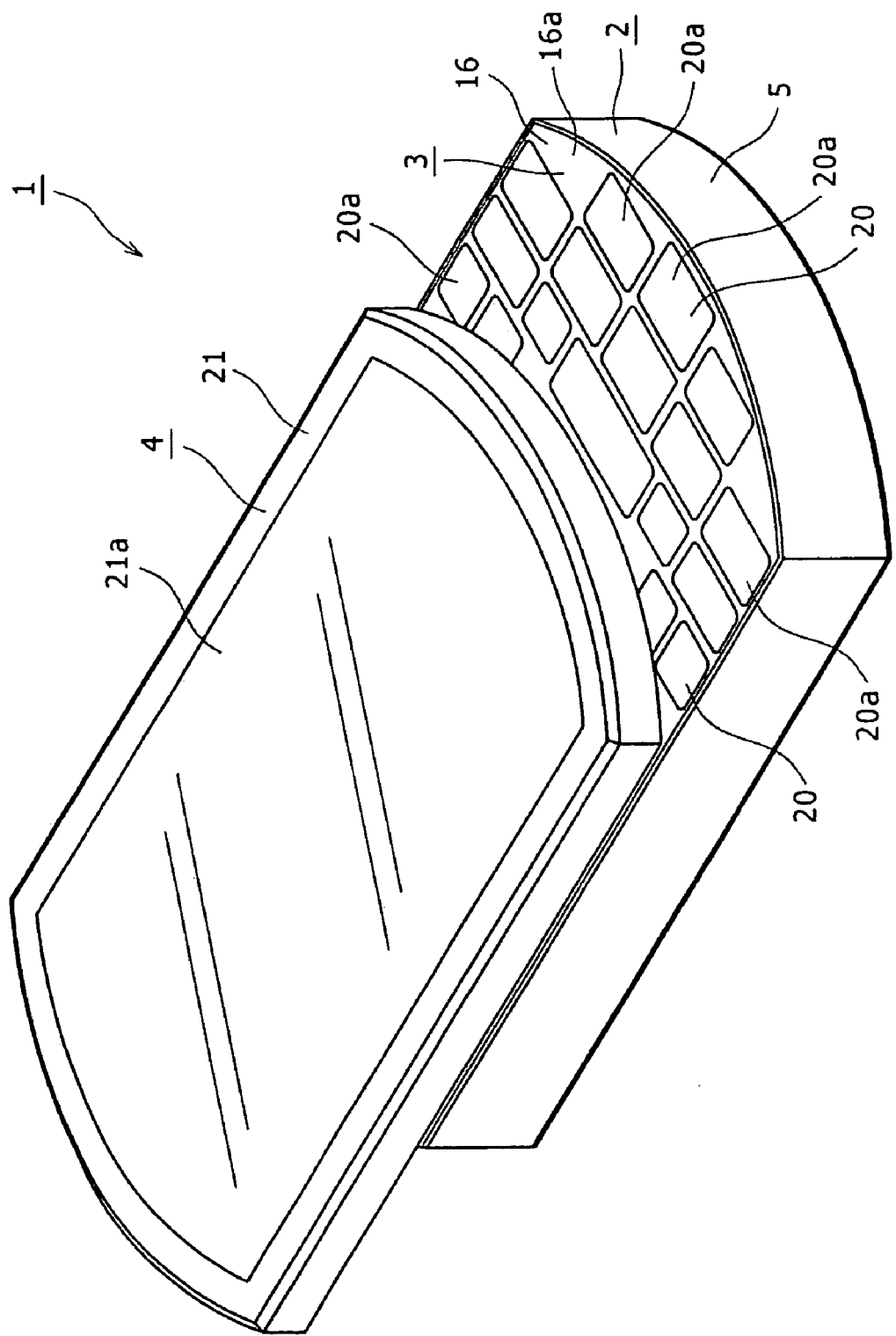
FIG. 4 is a perspective view showing the electronic apparatus in a state wherein the second operation section is open.

The lid member 4 is supported for sliding movement in the leftward and rightward directions on the intermediate member 3 such that the guided pieces 22b, 22b of the slider 22 are individually engaged for sliding movement with the guide portions 14b, 14b of the slide member 14 of the intermediate member 3. The leftward and rightward directions which are the directions of movement of the lid member 4 with respect to the intermediate member 3 are defined as a first direction, and the lid member 4 is movable between a first closed position (refer to FIG. 1) which is an end of movement on the right side in the first direction and a first open position (refer to FIG. 4) which is an end of movement on the left side with respect to the intermediate member 3.

Figure 5:
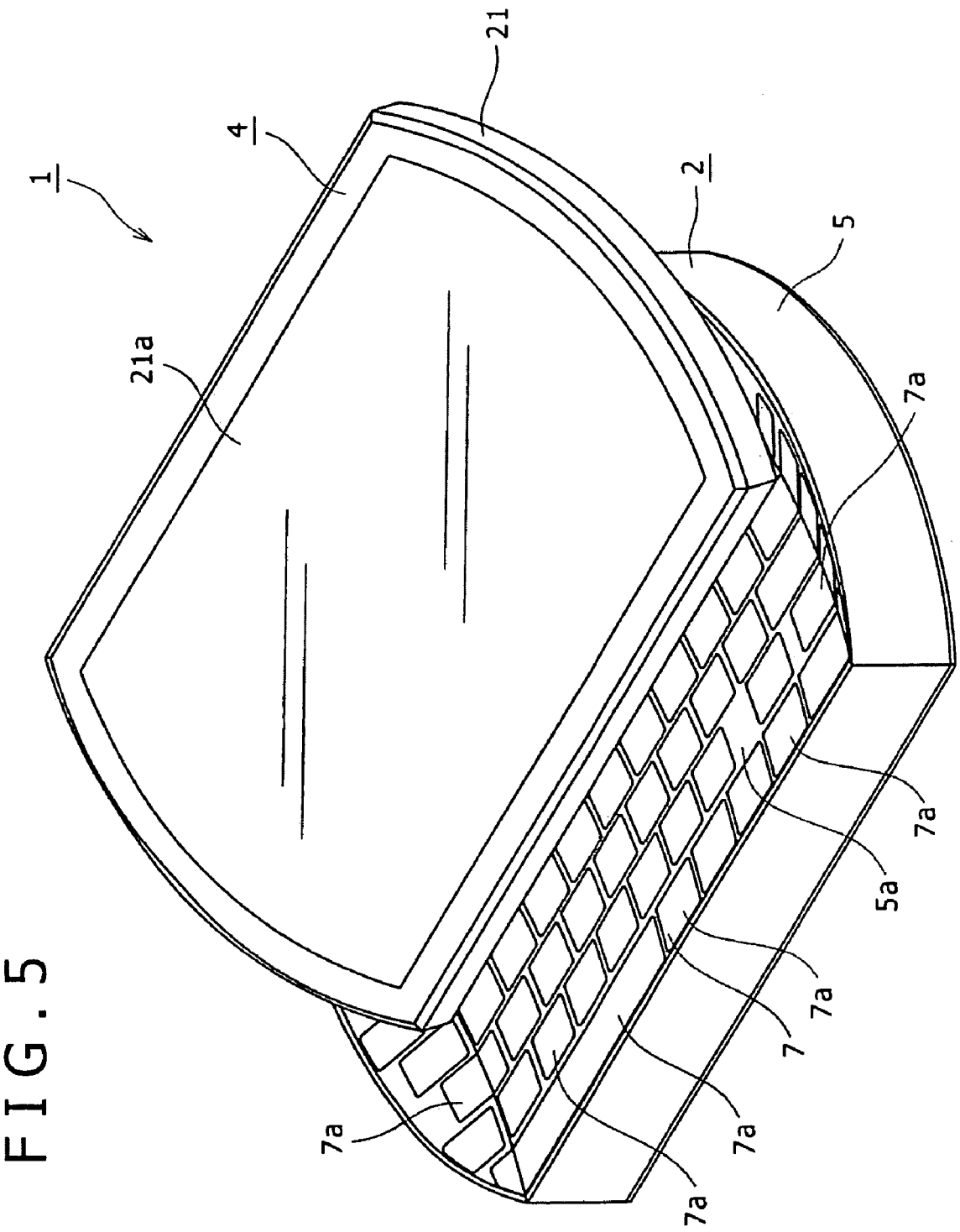
FIG. 5 is a perspective view showing the electronic apparatus in a state wherein the first operation section is open.

The lid member 4 is moved in an arcuate direction with respect to the base member 2 integrally with the intermediate member 3 when the intermediate member 3 is slidably moved in the arcuate direction described hereinabove with respect to the base member 2. The arcuate direction which is the direction of movement of the intermediate member 3 and the lid member 4 with respect to the base member 2 is defined as a second direction, and the intermediate member 3 and the lid member 4 are movable between a second closed position (refer to FIG. 1) which is an end of movement on the front side and a second open position (refer to FIG. 5) which is an end of movement on the rear side with respect to the base member 2. The second closed position is the same position as the first closed position (refer to FIG. 1).

In the following, sliding movements of the electronic apparatus 1 are described (refer to FIGS. 6 to 14).

Figure 6:
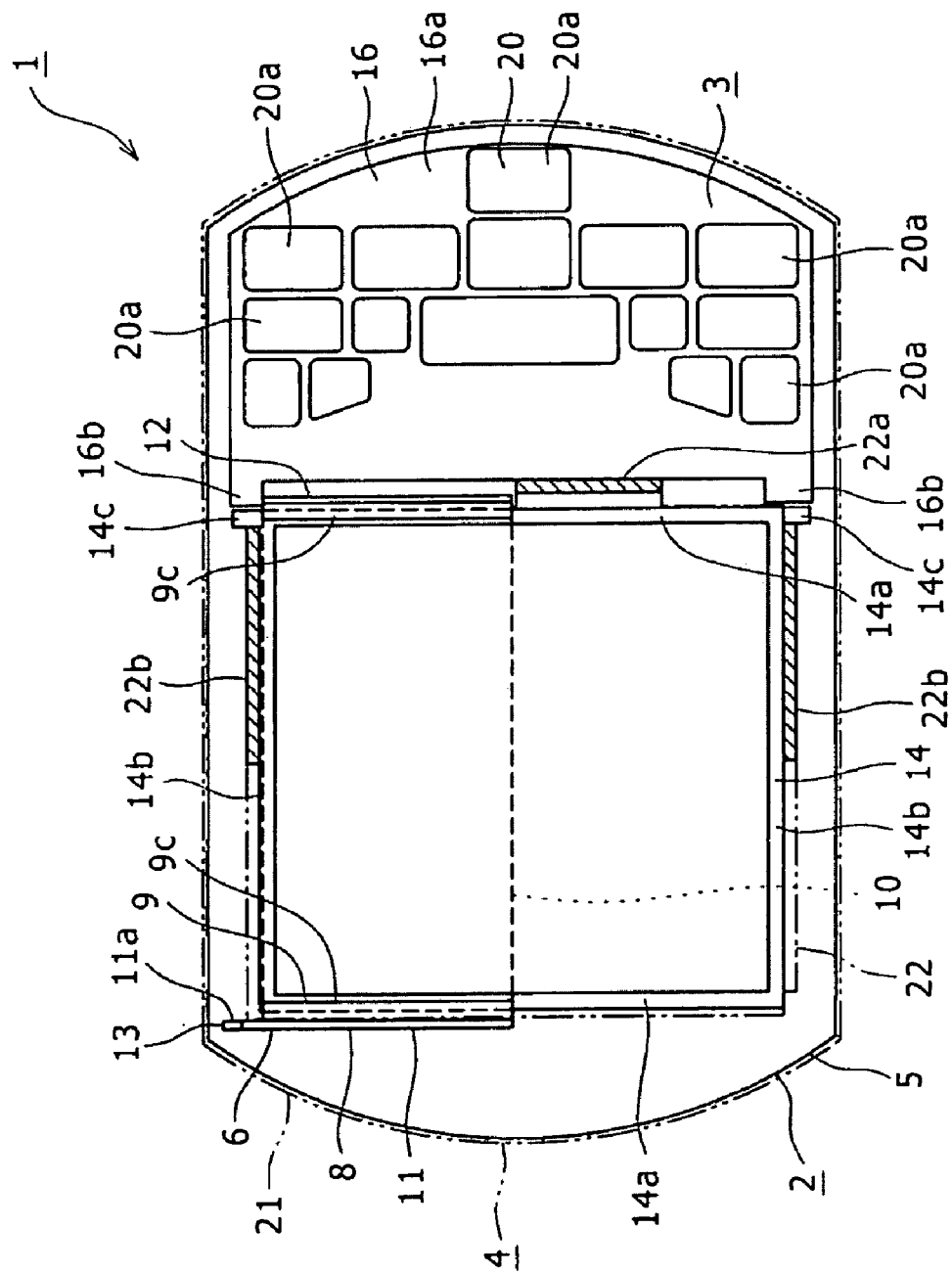
FIG. 6 illustrates movements of the electronic apparatus together with FIGS. 7 to 14, and this figure is a schematic plan view illustrating a state wherein the lid member is at a first closed position.
Figure 7:
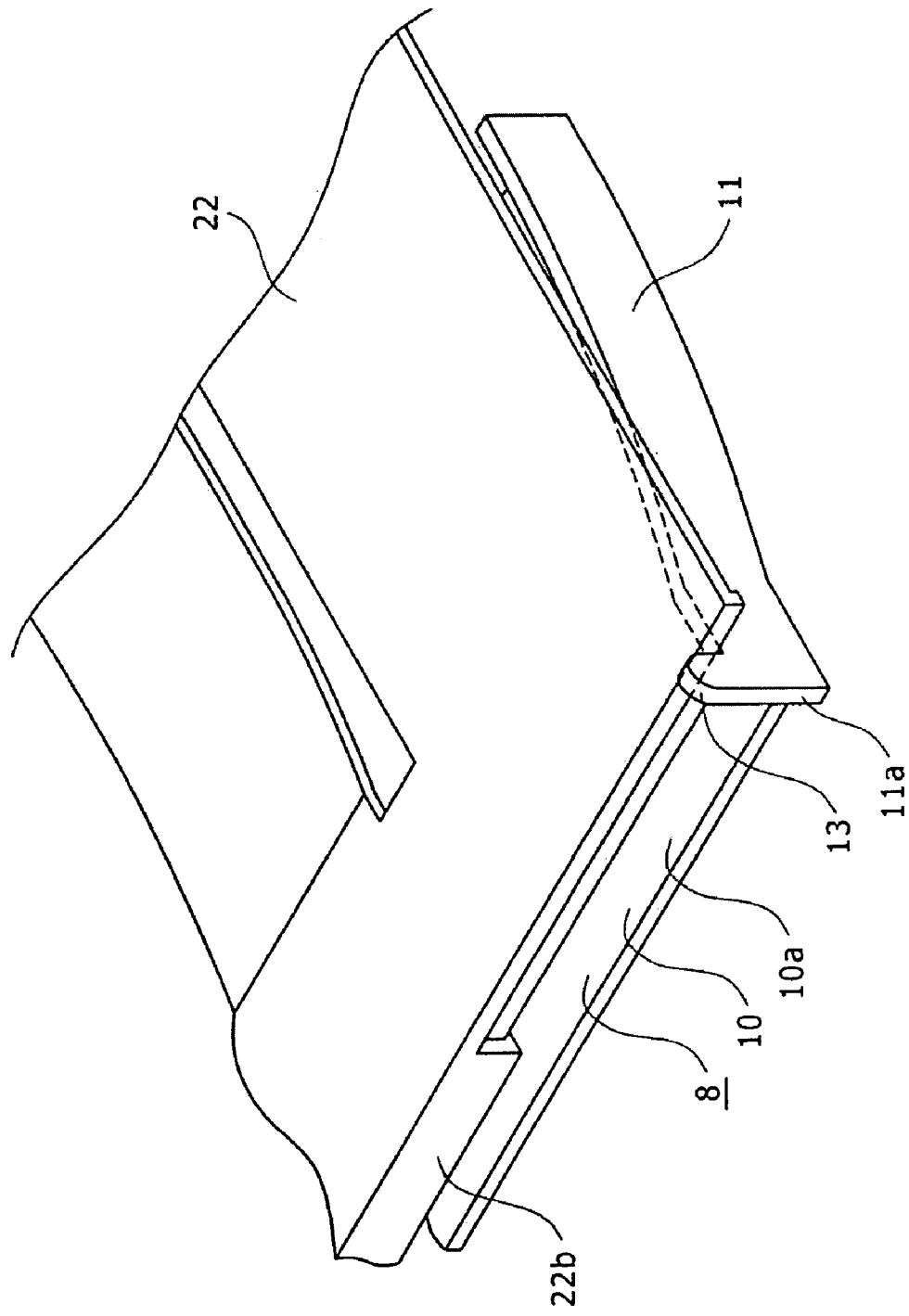
FIG. 7 is an enlarged perspective view illustrating a state wherein movement of the lid member in a second direction is blocked.
Figure 8:
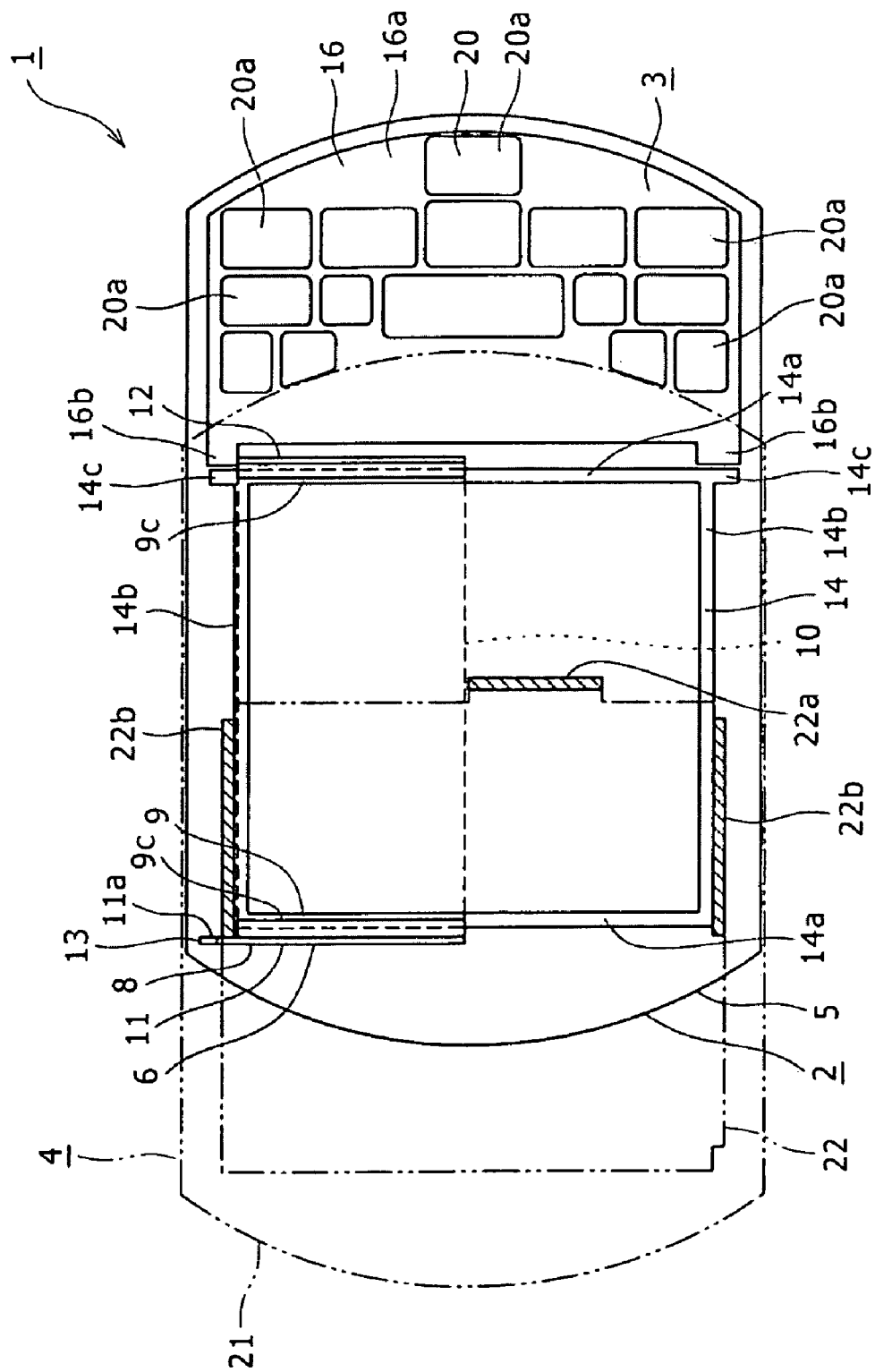
FIG. 8 is a schematic plan view illustrating a state wherein the lid member is positioned at a first open position.

First, movements of the lid member 4 in the first direction are described (refer to FIGS. 6 to 8).

In a state wherein the lid member 4 is positioned at the first closed position, the second operation section 20 of the intermediate member 3 is closed with the lid member 4 and the first operation section 7 of the base member 2 is closed with the lid member 4 and the intermediate member 3 as seen in FIG. 6. At the first closed position, the lid member 4 is biased rightwardly by a first toggle spring not shown, and the guided pieces 22b, 22b of the slider 22 of the lid member 4 are individually pressed from leftwardly against the stopper projections 14c, 14c of the slide member 14 of the intermediate member 3.

At the first closed position, the slider 22 is positioned rightwardly of the protruding portion 11 of the support base 6 of the base member 2, and the left side face of the slider 22 is positioned just on the right side of the protruding portion 11.

If the lid member 4 is pressed leftwardly, then the guided pieces 22b, 22b of the slider 22 are individually guided by the guide portions 14b, 14b of the slide member 14 so that the lid member 4 is moved leftwardly with respect to the intermediate member 3. At this time, the slider 22 of the lid member 4 is moved leftwardly passing the front side of the blocking portion 13 provided on the protruding portion 11 as seen in FIG. 7. Accordingly, even if external force is applied to the lid member 4 in a direction in which the lid member 4 is moved rearwardly (in the second direction), the rearward movement of the slider 22 is blocked by the blocking portion 13, and upon movement of the lid member 4 in the first direction, movement of the lid member 4 in an unintended direction (second direction) can be prevented. In this manner, the blocking portion 13 functions as a first blocking section for blocking movement of the lid member 4 in the second direction upon movement of the lid member 4 in the first direction.

When the lid member 4 is moved to a predetermined position, the biasing direction of the first toggle spring is reversed, and the lid member 4 is biased leftwardly by the first toggle spring.

The lid member 4 biased leftwardly is pressed at the rear side guided piece 22b thereof from rightwardly against the protruding portion 11 of the support base 6 of the base member 2, whereupon the leftward movement of the lid member 4 is stopped at the first open position. As the lid member 4 comes to the first open position, the second operation section 20 is opened to allow an operation for the second operation section 20. For the second operation section 20, for example, an operation where the electronic apparatus 1 is used as a portable telephone terminal is carried out.

On the other hand, if the lid member 4 which is positioned at the first open position is pressed rightwardly, then the lid member 4 is moved rightwardly while the guided pieces 22b, 22b of the slider 22 are guided individually by the guide portions 14b, 14b of the slide member 14. When the lid member 4 is moved to the predetermined position, the biasing direction of the first toggle spring is reversed and the lid member 4 is biased rightwardly by the first toggle spring.

The lid member 4 biased rightwardly is pressed at the guided pieces 22b, 22b of the slider 22 thereof individually against the stopper projections 14c, 14c of the slide member 14 from leftwardly as shown in FIG. 6, whereupon the rightward movement of the lid member 4 is stopped at the first closed position. As the lid member 4 comes to the first closed position, the second operation section 20 is closed.

Now, movements of the lid member 4 and the intermediate member 3 in the second direction are described (refer to FIGS. 9 to 14).

Figure 9:
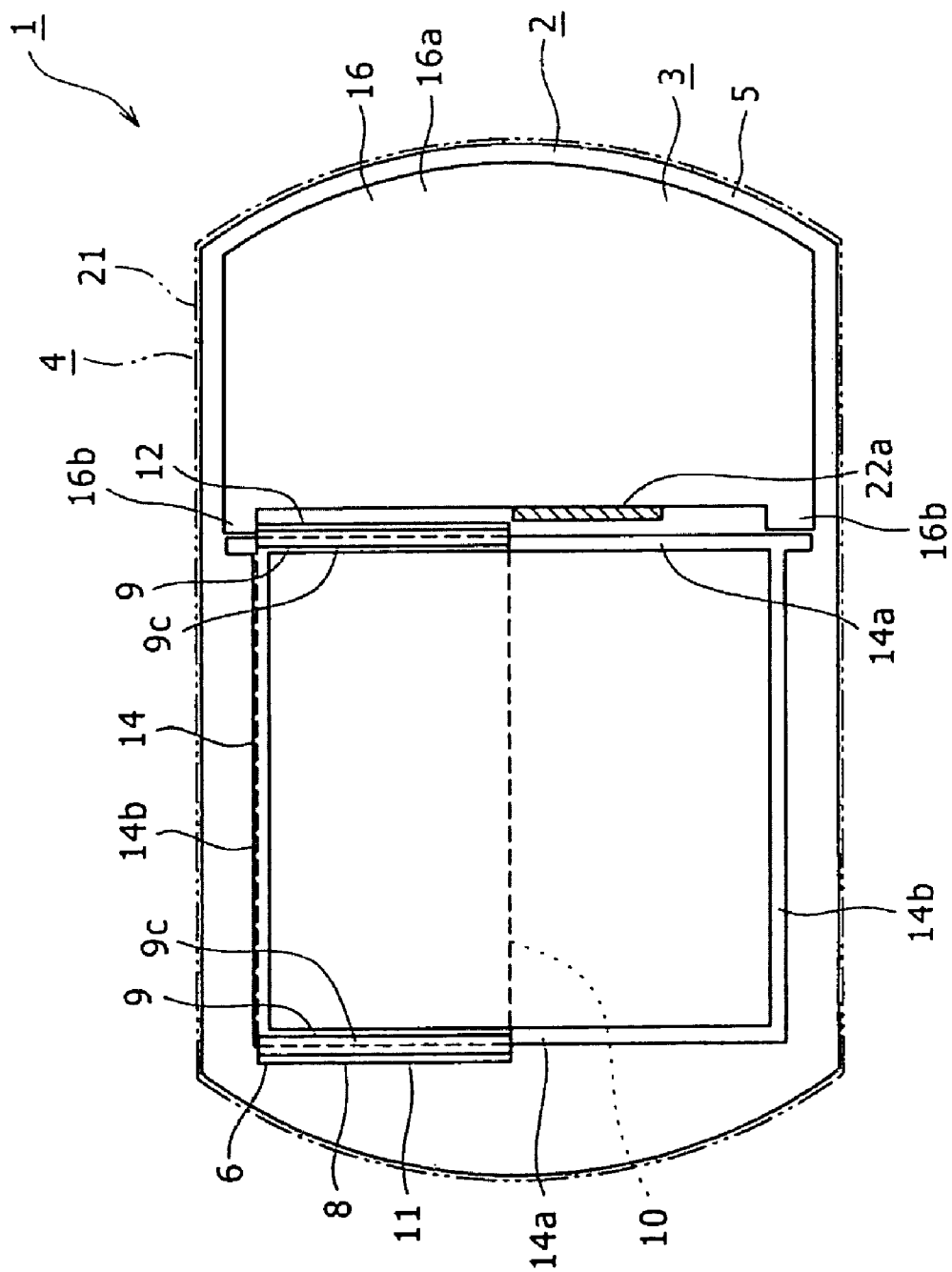
FIG. 9 is a schematic plan view illustrating a state wherein the lid member and the intermediate member are positioned at a second closed position.

In the state wherein the lid member 4 is positioned at the second closed position, the second operation section 20 of the intermediate member 3 is closed with the lid member 4 and the first operation section 7 of the base member 2 is closed with the intermediate member 3 as seen in FIG. 9. At the second closed position, the lid member 4 and the intermediate member 3 are biased forwardly by a second toggle spring not shown and the movement blocking projection 16b on the rear side of the operation plate 16 of the intermediate member 3 is pressed against the guide protrusion 12 of the support base 6 of the base member 2 from forwardly.

Figure 10:
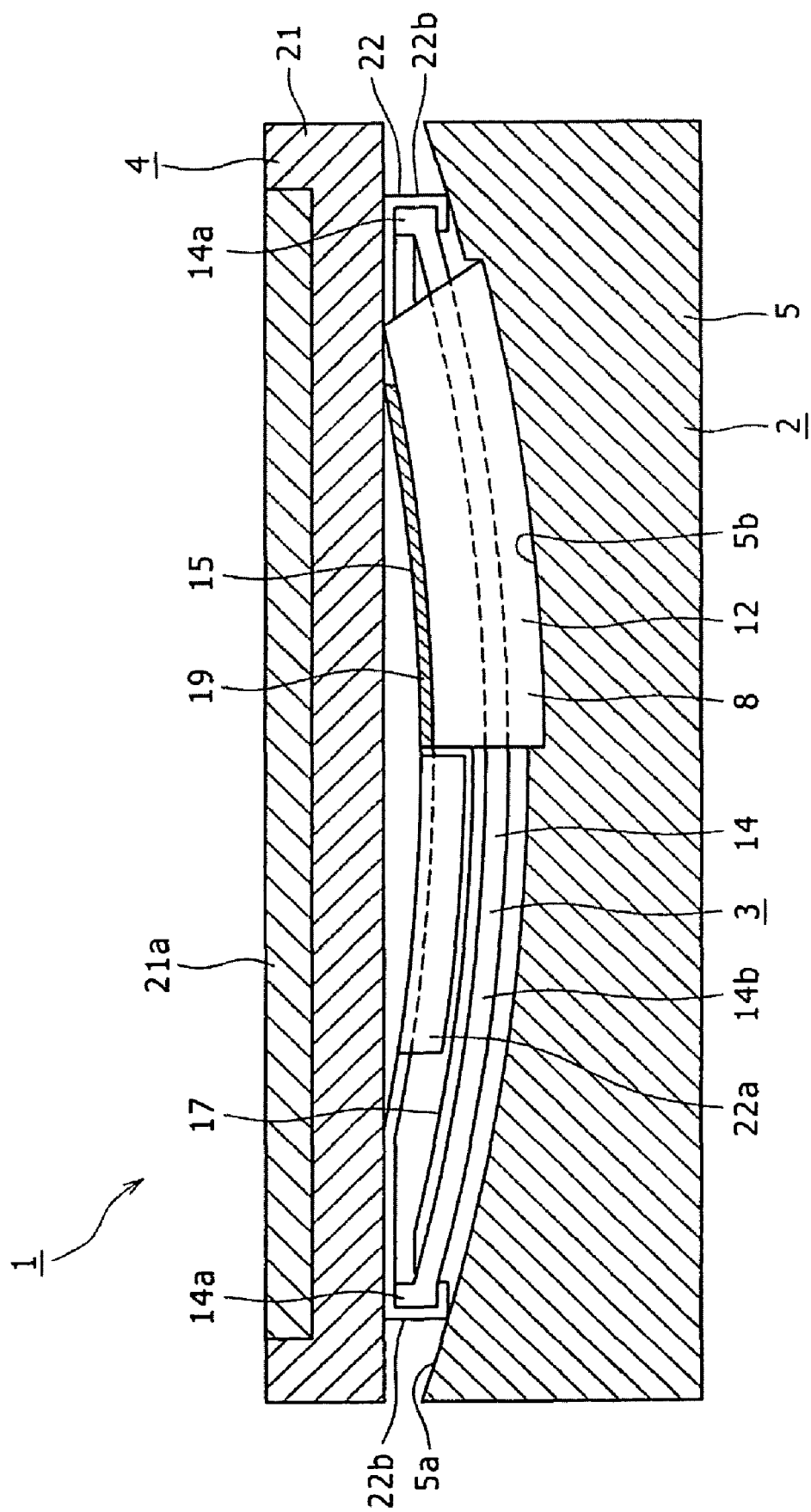
FIG. 10 is a schematic side elevational view illustrating, partly in section, a state wherein the lid member and the intermediate member are positioned at a second closed position.

At the second closed position, the blocked piece 22a of the slider 22 is positioned forwardly of the guide protrusion 12 of the support base 6 and the rear face of the blocked piece 22*a* is positioned just on the front side of the guide protrusion 12 as seen, in FIGS. 9 and 10.

Figure 11:
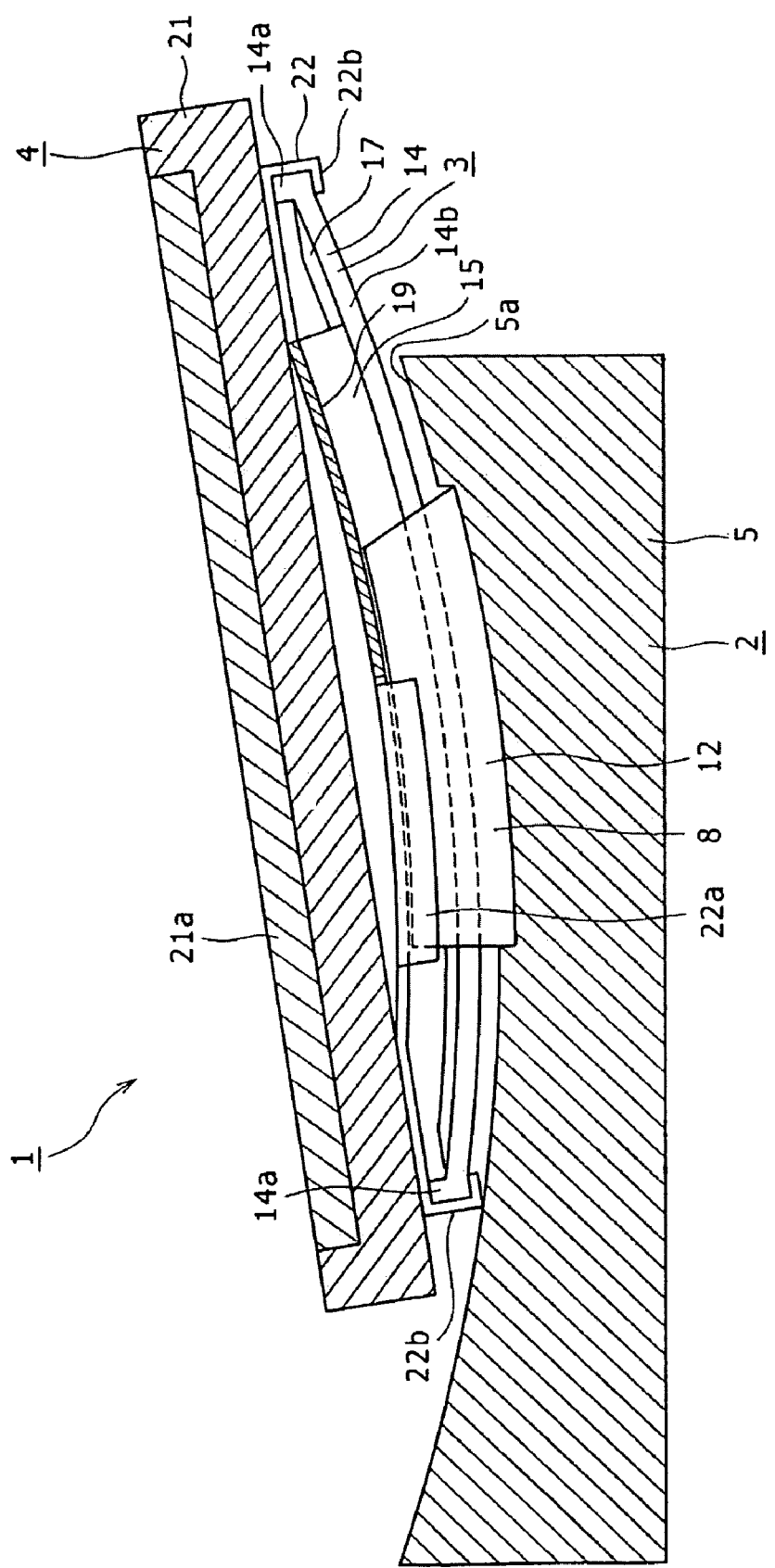
FIG. 11 is a schematic sectional view illustrating, partly in section, an intermediate state while the lid member and the intermediate member are being moved in the second direction.
Figure 12:
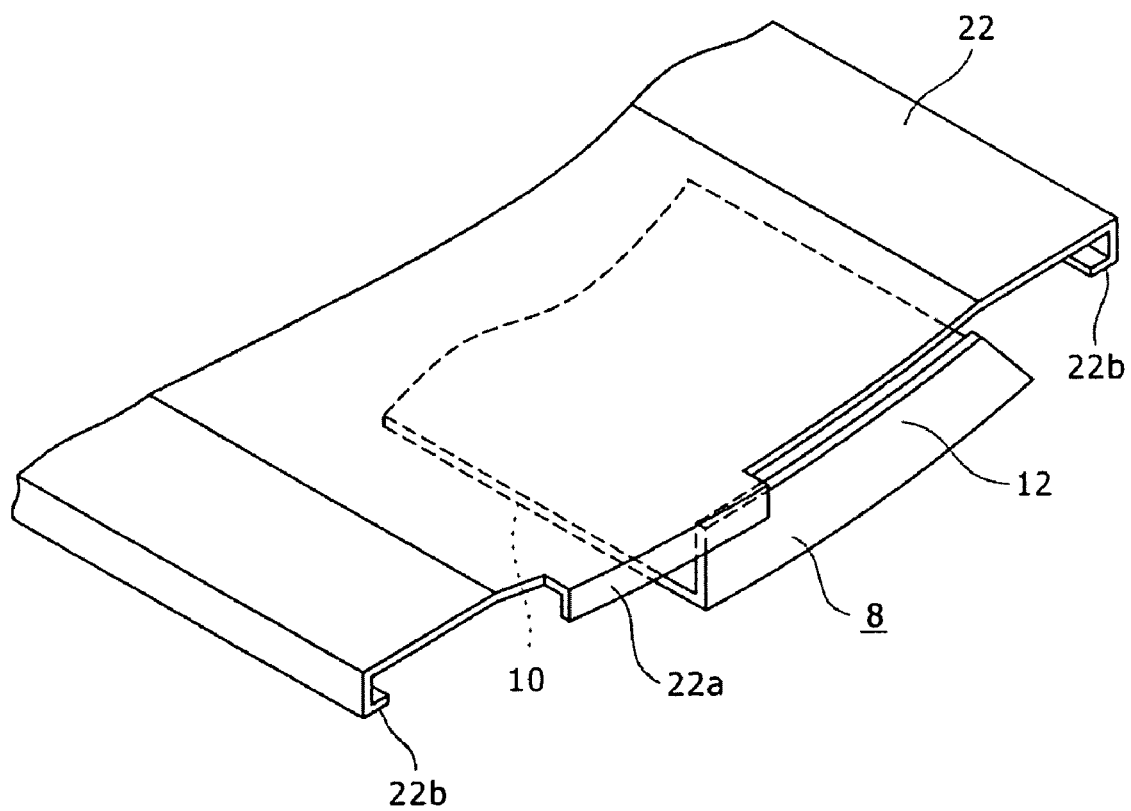
FIG. 12 is an enlarged perspective view illustrating a state wherein movement of the lid member and the intermediate member in the first direction is blocked.

If the lid member 4 or the intermediate member 3 is pressed rearwardly, then the lid member 4 and the intermediate member 3 are moved while making an arcuate movement obliquely rearwardly upwards with respect to the base member 2 while the guided portions 14*a*, 14*a* of the slide member 14 are individually guided by the guide members 9, 9 of the support base 6 (refer to FIG. 11). At this time, the blocked piece 22*a* of the slider 22 is moved obliquely rearwardly upwards passing the right side of the guide protrusion 12 of the support base 6 as seen in FIG. 12. Accordingly, even if external force is applied to the lid member 4 and the intermediate member 3 in a direction in which the lid member 4 and the intermediate member 3 are moved leftwardly (in the first direction), the leftward movement of the slider 22 is blocked by the guide protrusion 12, and upon movement of the lid member 4 and the intermediate member 3 in the second direction, movement of the lid member 4 and the intermediate member 3 in an unintended direction (first direction) can be prevented. In this manner, the guide protrusion 12 functions as a second blocking section for blocking movement of the lid member 4 and the intermediate member 3 in the first direction upon movement of the lid member 4 and the intermediate member 3 in the second direction.

When the lid member 4 and the intermediate member 3 are moved while making an arcuate movement in an obliquely rearwardly upward direction, the intermediate member 3 is guided at the guided protrusion 19 of the connection plate 15 thereof by the guide protrusion 12 of the support base 6 of the base member 2.

When the lid member 4 and the intermediate member 3 are moved to a predetermined position, the biasing direction of the second toggle spring is reversed and the lid member 4 and the intermediate member 3 are biased rearwardly by the second toggle spring.

Figure 13:
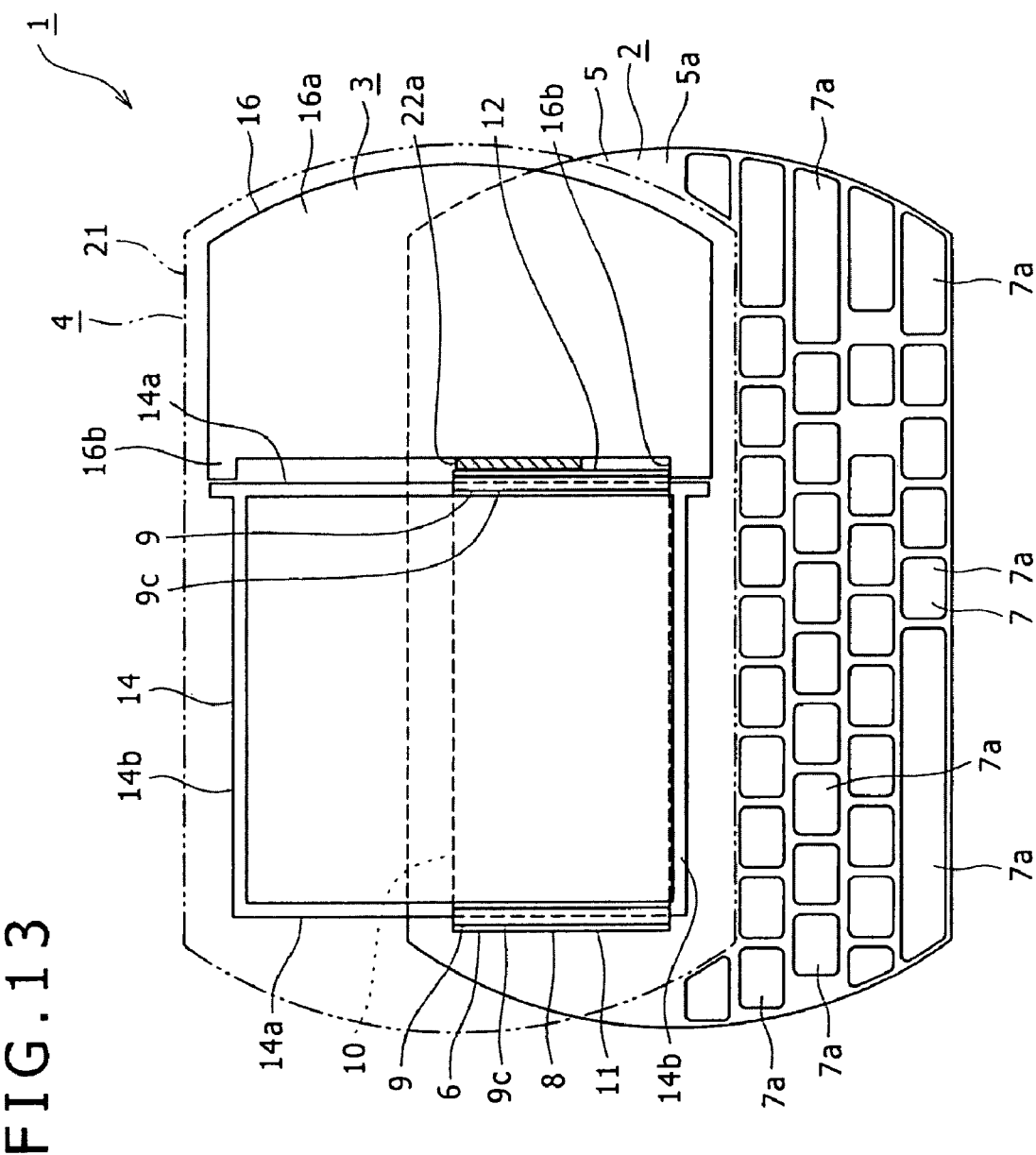
FIG. 13 is a schematic plan view illustrating a state wherein the lid member and the intermediate member are positioned at a second open position.
Figure 14:
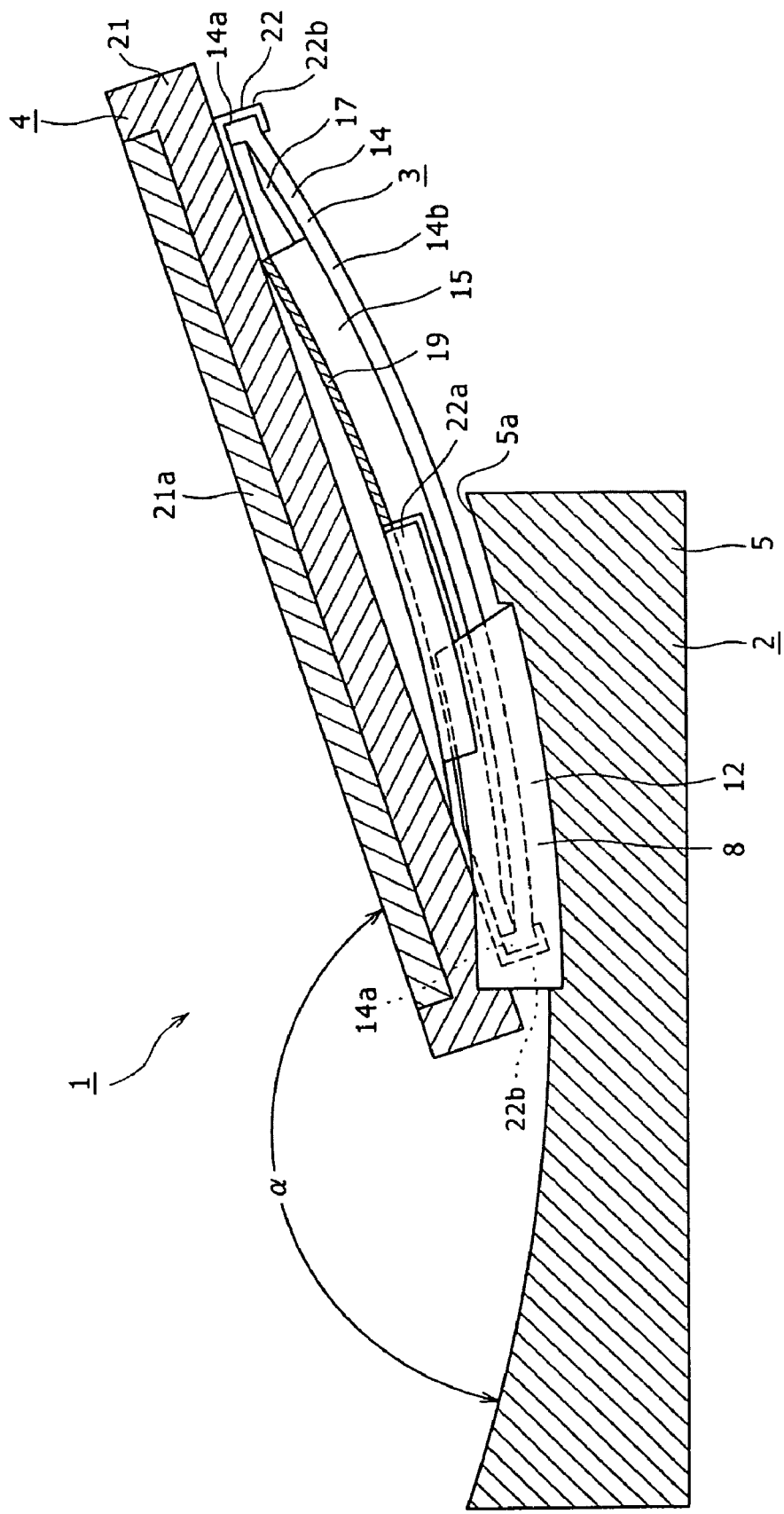
FIG. 14 is a schematic side elevational view illustrating, partly in section, a state wherein the lid member and the intermediate member are positioned at the second open position.

As shown in FIGS. 13 and 14, the lid member 4 and the intermediate member 3 biased rearwardly are pressed at the front side movement blocking projection 16*b* of the operation plate 16 against the guide protrusion 12 of the support base 6 of the base member 2 from forwardly, whereupon the obliquely rearward upward movement of the lid member 4 and the intermediate member 3 is stopped at the second open position. When the lid member 4 and the intermediate member 3 come to the second open position, the first operation section 7 is opened thereby to allow an operation for the first operation section 7.

In the state wherein the lid member 4 and the intermediate member 3 come to the second open position, the display section 21*a* provided on the lid member 4 is placed into a state wherein it is inclined by a predetermined angle a smaller than 180' with respect to the second operation section 20 (refer to FIG. 14). For the first operation section 7, for example, an operation where the electronic apparatus 1 is used as a personal computer is carried out.

On the other hand, if the lid member 4 and the intermediate member 3 which are positioned at the second open position are pressed forwardly, then the lid member 4 and the intermediate member 3 are moved obliquely forwardly downwards with respect to the base member 2 while the guided portions 14*a*, 14*a* of the slide member 14 are individually guided by the guide members 9, 9 of the support base 6. When the lid member 4 and the intermediate member 3 are moved to the predetermined position, the biasing direction of the second toggle spring is reversed and the lid member 4 and the intermediate member 3 are biased forwardly by the second toggle spring.

The lid member 4 and the intermediate member 3 biased forwardly are pressed at the rear side movement blocking projection 16*b* of the operation plate 16 against the guide protrusion 12 of the support base 6 of the base member 2 from rearwardly as seen in FIGS. 9 and 10, and the obliquely rearwardly downward movement of the lid member 4 and the intermediate member 3 is stopped at the second closed position. When the lid member 4 and the intermediate member 3 come to the second closed position, the first operation section 7 is closed.

As described above, in the electronic apparatus 1, since the intermediate member 3 and the lid member 4 which has the display section 21*a* are slidably moved in an arcuate direction with respect to the base member 2 which has the first operation section 7, the display section 21*a* is placed into a state wherein the display section 21*a* is inclined by a predetermined angle with respect to the first operation section 7 at the second open position, and when the first operation section 7 is operated, the display section 21*a* can be visually observed readily. Consequently, improvement in convenience in use can be anticipated.

Further, since the sliding direction of the lid member 4 can be changed between the first direction and the second direction, an operation for the first operation section 7 or the second operation section 20 can be carried out in response to an application in use. Consequently, improvement in functionality can be anticipated and improvement in convenience in use can be anticipated.

Further, in the electronic apparatus 1, since both of the mechanism for slidably moving the lid member 4 in the first direction with respect to the intermediate member 3 and the mechanism for slidably moving the lid member 4 and the intermediate member 3 in the second direction with respect to the base member 2 are provided on the inner side of the outer peripheral face of the electronic apparatus 1, miniaturization of the electronic apparatus 1 can be anticipated. Further, since the slide mechanisms are not exposed to the outside, damage to the slide mechanisms does not occur and smooth sliding movement of the lid member 4 and the intermediate member 3 can be anticipated.

Furthermore, in the electronic apparatus 1, since the blocking portion 13 which functions as the first blocking section for blocking movement of the lid member 4 in the second direction upon movement of the lid member 4 in the first direction and the guide protrusion 12 which functions as the second blocking member for blocking movement of the lid member 4 and the intermediate member 3 in the first direction upon movement of the lid member 4 and the intermediate member 3 in the second direction are provided on the base member 8 as the same member, simplification in mechanism can be anticipated.

In addition, since the guide protrusion 12 and the blocking portion 13 are formed integrally on the base member 8, reduction of the production cost by reduction of the number of parts can be anticipated.

It is to be noted that, while the example wherein the base member 8 and the guide members 9, 9 are formed separately from each other and are coupled to each other to form the support base 6 is described, the base member and the guide members may be formed integrally to form the support base. In this instance, reduction of the number of parts can be achieved.

Further, while the example wherein the first direction in which the lid member 4 is slidably moved is a linear direction and the second direction in which the lid member 4 and the intermediate member 3 are slidably moved is an arcuate direction is described above, it is otherwise possible to conversely set the first direction along which the lid member 4 is slidably moved as an arcuate direction and set the second direction in which the lid member 4 and the intermediate member 3 are slidably moved as a linear direction.

Furthermore, also it is possible to set both of the first direction in which the lid member 4 is slidably moved and the second direction in which the lid member 4 and the intermediate member 3 are slidably moved as an arcuate direction.

The particular shapes and structures of the components presented hereinabove in connection with the embodiment of the invention described above indicate a mere example in embodiment when one embodiment of the invention is carried out, and the technical scope of one embodiment of the invention shall not be interpreted restrictively by them.

The invention claimed is:

1. A slide mechanism, comprising:
    a lid member including a display section;
    an intermediate member including said lid member connected thereto, that is configured to slide in a first direction, and including a second operation section which is exposed in an interlocking relationship with the sliding movement of said lid member; and
    a base member including said intermediate member connected thereto, that is configured to slide in a second direction perpendicular to the first direction, and including a first operation section which is exposed in an interlocking relationship with the sliding movement of said intermediate member,
    wherein at least one of the sliding movement of said lid member and the sliding movement of said intermediate member is an arcuate movement.

2. The slide mechanism according to claim 1, wherein said lid member includes a slider;
    said intermediate member includes a slide member configured to support said slider that is configured to slide in the first direction;
    said base member includes a support base configured to support said slide member that is configured to slide in the second direction.

3. The slide mechanism according to claim 2, wherein said slider is provided on an inner side with respect to an outer periphery of said lid member;
    said slide member is provided on an inner side with respect to an outer periphery of said intermediate member;
    said support base is provided on an inner side with respect to an outer periphery of said base member.

4. The slide mechanism according to claim 2, further comprising:
    a first blocking section configured to block the movement of said lid member in the second direction when said lid member is moved in the first direction; and
    a second blocking section that is configured to block the movement of said intermediate member in the first direction when said intermediate member is moved in the second direction.

5. The slide mechanism according to claim 4, wherein said support base includes said first blocking section and said second blocking section.

6. The slide mechanism according to claim 4, wherein said lid member is provided with a guided piece that is configured to engage with said first blocking section at a first open position to block the sliding movement.

7. The slide mechanism according to claim 4, wherein said intermediate member is provided with a movement blocking projection that is configured to engage with said second blocking section at a second open position to block the sliding movement.

8. The slide mechanism according to claim 4, wherein each of said first blocking section and said second blocking section is a protrusion and is integrated with said base member.

9. The slide mechanism according to claim 2, wherein said support base has an arcuate shape.

10. The slide mechanism according to claim 1, wherein an arrangement of operation keys of said first operation section is the QWERTY arrangement.

11. The slide mechanism according to claim 1, wherein said base member has a first face of an arcuate shape, a second face provided adjacent to one side of the first face in an inclined relationship in a direction toward a center axis of the first face, and a third face provided adjacent to another side of the first face in an inclined relationship in a direction toward the center axis of the first face.

12. The slide mechanism according to claim 11, wherein said first operation section is provided on at least one of the second face and the third face.

13. An electronic apparatus, comprising:
    a lid member including a display section;
    an intermediate member including said lid member connected thereto, that is configured to slide in a first direction, and including a second operation section which is exposed in an interlocking relationship with the sliding movement of said lid member; and
    a base member including said intermediate member connected thereto, that is configured to slide in a second direction perpendicular to the first direction, and including a first operation section which is exposed in an interlocking relationship with the sliding movement of said intermediate member,
    wherein at least one of the sliding movement of said lid member and the sliding movement of said intermediate member is an arcuate movement.

* * * * *